(12) United States Patent
Campagna et al.

(10) Patent No.: US 7,813,503 B2
(45) Date of Patent: Oct. 12, 2010

(54) METHOD AND SYSTEM FOR GENERATION OF CRYPTOGRAPHIC KEYS FOR USE IN CRYPTOGRAPHIC SYSTEMS

(75) Inventors: Matthew J. Campagna, Ridgefield, CT (US); Yiqun Yin, Riverside, CT (US)

(73) Assignee: Pitney Bowes Inc., Stamford, CT (US)

( * ) Notice: Subject to any disclaimer, the term of this patent is extended or adjusted under 35 U.S.C. 154(b) by 1064 days.

(21) Appl. No.: 11/520,362

(22) Filed: Sep. 13, 2006

(65) Prior Publication Data

US 2008/0063190 A1    Mar. 13, 2008

(51) Int. Cl.
*H04L 9/00* (2006.01)
(52) U.S. Cl. .................. 380/44; 380/46; 380/277
(58) Field of Classification Search .................. 380/44, 380/46, 277
See application file for complete search history.

(56) References Cited

U.S. PATENT DOCUMENTS

| 2006/0002550 A1 | 1/2006 | Campagna et al. |
| 2006/0126842 A1 | 6/2006 | Campagna et al. |

OTHER PUBLICATIONS

Designing of High-Speed Image Cryptosystem Using VQ Generated Codebook and Index Table Pal, A.K.; Biswas, G.P.; Mukhopadhyay, S.; Recent Trends in Information, Telecommunication and Computing (ITC), 2010 International Conference on Publication Year: 2010, pp. 39-43.*

Probabilistic encryption key exchange; Moreau, T.; Electronics Letters vol. 31, Issue: 25 Publication Year: 1995, pp. 2166-2168.*

Cellular phone based web authentication system using 3-D encryption technique under stochastic framework Gupta, S.; Sengupta, S.; Bhattacharyya, M.; Chattrejee, S.; Sharma, B.S.; Internet, 2009. AH-ICI 2009. First Asian Himalayas International Conference on Publication Year: 2009, pp. 1-5.*

* cited by examiner

*Primary Examiner*—David Y Jung
(74) *Attorney, Agent, or Firm*—Brian A. Lemm; Angelo N. Chaclas

(57) ABSTRACT

A method and deterministic random bit generator system operating in accordance with the method, for generating cryptographic keys and similar secret cryptographic inputs which are hard to guess. A entropy is input from an entropy source; and an initial seed is generated as a function of the entropy input. When a request to generate a cryptographic key is received a temporary seed is generated by applying the function to the seed. The requested cryptographic key is generated by applying a second function to the temporary seed; and output. A new seed is then generated by applying a third function to the temporary seed. In one embodiment of the subject invention all three functions are carried out by applying the same operator to appropriate inputs. In another embodiment of the subject invention new entropy is incorporated into the seed from time to time.

14 Claims, 10 Drawing Sheets

METHOD AND SYSTEM FOR GENERATION OF CRYPTOGRAPHIC KEYS FOR USE IN CRYPTOGRAPHIC SYSTEMS

BACKGROUND OF THE INVENTION

The subject invention relates to a method and system for generating secret inputs, such as keys, to a cryptographic system. More particularly it relates to a method and system for generating inputs, typically in the form of binary strings, which are "hard" to guess. By "hard" herein is meant that given realistic computational resources a secret input cannot be discovered, given less than all the inputs used to create the secret input, in less than exponential time. Still more particularly it relates to a method and system for generating keys for digital postage meters which rely on cryptographic techniques to create secure, digitally printed postal indicia.

Encryption, Digital Signature algorithms, and Key Agreement Protocols and similar cryptographic systems rely on two basic assumptions to keep information secure: (i) the algorithms used are sound, and cannot be attacked directly. That means you cannot derive information about inputs to the algorithm that you did not know before hand; nor can you derive the output of the algorithm unless you know all the inputs; and (ii) any secret input of the algorithm is hard to guess. Typically secret inputs are inputs such as: a secret key, a random value used for "blocking" (i.e. used to hide other information), or the private portion of a public key pair. (As used herein the terms "key" or "cryptographic key" are meant to include any string of random bits for cryptographic applications, such as a secret input or a hard to guess value from which a secret input is derived; e.g. a hard to guess value from which a public/private key pair is derived; as well as strings used in applications where the random bits become known and still strong security is required.)

Deterministic Random Bit Generators (DRBG's) are used to satisfy this second assumption, and are used throughout standard cryptographic protocols and operations such as: SSL/TLS Secure Sockets Layer Protocol, DSA—Digital Signature Algorithm, Diffie-Hellman Key Exchanges, RSA Encryption and Signing Algorithms, etc. DRBG's provide the basic hard to guess inputs to such cryptographic operations. Typically DRBG's include an initialization routine to generate an initial state variable, a generation routine to generate a requested secret input, and can include a reseed routine to recover security properties in the event the DRBG is compromised.

The current family of ANSI (American National Standards Institute) approved DRBG's (based on Data Encryption Standard (DES) and Secure Hash Algorithm (SHA) standards) are aging in the sense of being antiquated by newer algorithms and stronger security requirements. In fact DES is broken in the sense that a sub-exponential algorithm to break it is known.

Current security specifications for Advanced Encryption Standard (AES) and Elliptic Curve Cryptography (ECC) provide security that require on the order of $2^{256}$ computational operations to break an algorithm. While DRBG's that adequately provide that level of security have been described; that is which can require a number of operations of the same order to break the algorithm and to discover the secret key used, thus maintaining overall security; such DRBG's are believed to be relatively complex, and difficult to design and analyze.

It is also advantageous to provide a DRBG having a consistent, or "flat", forward secrecy profile and backward secrecy, against all known state assumptions. Backward secrecy is the property that even with knowledge of the current state of the DRBG it remains hard to determine previous components of the state. A flat forward secrecy profile is the property that even with any (less than complete) knowledge of the current state it remains hard to predict future output of the DRBG, or future unknown components of the state.

Thus it is an object of the subject invention to provide a method and system for generating secret inputs that provide increased levels of security for cryptographic systems, and that has the properties of a flat forward secrecy profile and backwards secrecy, while having a relative degree of simplicity of design and ease of analysis.

BRIEF SUMMARY OF THE INVENTION

The above objects are achieved and the disadvantages of the prior art are overcome in accordance with the subject invention by a method, and system operating in accordance with the method, for generating a cryptographic key which is hard to guess. The system includes an input for input of parameters or values used to specify cryptographic keys to be generated; a data store for storing algorithms and constants used to specify said keys, and an initial state defining a particular instantation of the algorithm; an entropy source; and a deterministic random bit generator communicating with said input, said data store, and said entropy source.

In accordance with an aspect of the invention the system generates said keys by initializing a seed value, V, as a first function of an entropy_input; generating a temporary seed value, tempV, by applying said first function to said value, V; generating a requested number of pseudorandom bits as a second function of said temporary value, tempV; setting said value, V, equal to a third function of said temporary value, tempV; outputting to a cryptographic engine said requested number of pseudorandom bits; and using, at said cryptographic engine, said requested number of pseudorandom bits as said key in a cryptographic operation, wherein said first and third functions are one-way functions which take a variable length input and generate an output of a predetermined length, and which maintain said variable length input's entropy; and said second function is a pseudorandom function which takes in an input equal in length to said output of said first and third functions and generates said requested number of pseudorandom bits.

In accordance with another aspect of the invention the system generates said keys by carrying out additional steps including prior to generating a temporary seed value, determining if a reseed operation is necessary; and if so, setting said value, V, equal to a new value by applying said first function to said value, V, concatenated with a new entropy_input.

In accordance with another aspect of the invention the first and third functions comprise applying an operator, F1, to first and third inputs and the second function comprises applying an operator, F2, to second inputs.

In accordance with another aspect of the invention said first function equals applying said operator, F1, to arguments (X‖additional_input, seedlen) and said third function equals applying said operator, F1, to arguments (tempV‖reseed_counter, seedlen) and said second function equals applying said operator F2 to arguments (tempV, requested_number_of_bits): where X is said first input, taking on values: entropy_input, V‖entropy_input or V as required, V is said third input, tempV is said second input, additional_input is a user supplied entropy input, (which can be a NULL input so that X‖NULL=X), seedlen is a predetermined constant which determines an output length for said first and third functions, reseed_counter is a value representing the number of requests for key generation since a last reseed operation, and said requested_number_of_bits determines an output length for said second function.

In accordance with another aspect of the invention carrying out said functions comprises receiving a binary input of arbitrary length, bitstring, and an integer defining a number of bits to be returned, where: bitstring takes on values: X||additional_input, tempV||reseed_counter, or tempV, and said integer takes on values: seedlen or requested_number_of_bits, as required; setting said value, temp, equal to NULL; setting a value, ctr, equal to ceil(said integer divided by an output length, outlen, of a preselected hash function, Hash,), where ceil is a function such that ceil(x) equals the least integer greater than or equal to x; for an index i taking on values from 1 to ctr iteratively setting said value, temp, equal to temp||Hash(i||bitstring); then selecting a number of bits equal to said integer from said value, temp, in a predetermined manner and setting a value, requested_bits, equal to said selected bits; and returning said value, requested_bits.

In accordance with another aspect of the invention said function, Hash, is chosen so that said length, outlen, is equal to or greater than said value, strength, or, if collision resistance is required, is equal to or greater than 2 times strength, and said constant, seedlen, is set equal to said length, outlen.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
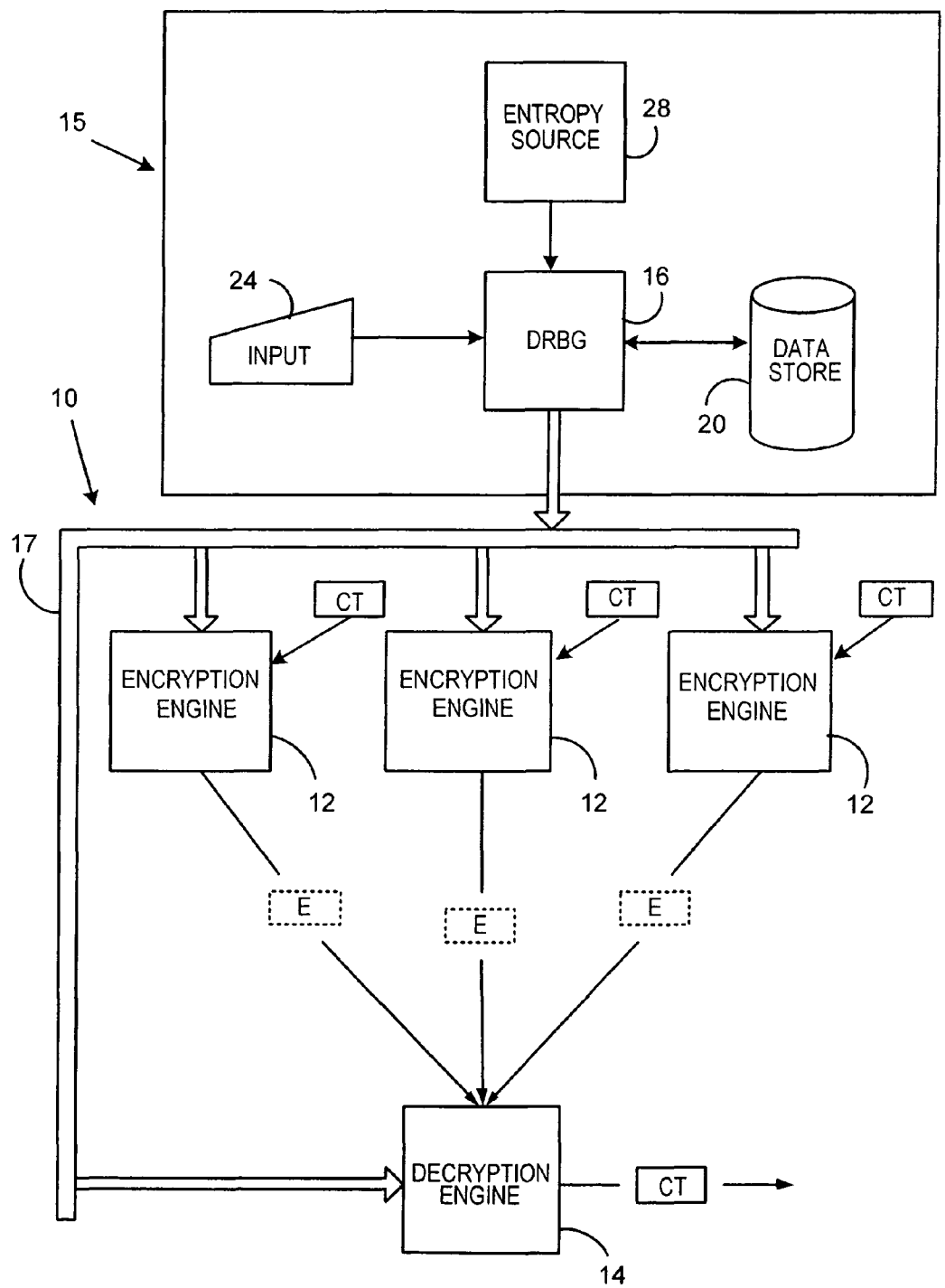
FIG. 1 shows a schematic block diagram of an encryption system comprising a DRBG in accordance with the subject invention.

The following Table 1 sets forth definitions for terms used below.

TABLE 1

| Term | Definition |
| --- | --- |
| ||: | "is concatenated with" |
| additional_input: | A user provided entropy input. |
| allow_prediction_resistance: | Input to Instantate_DRBG controlling allow_prediction_resistance flag. |
| allow_prediction_resistance_flag: | Allows calls to reseed_DRBG for new entropy_input when set. |
| bitstring: | Input string for derivation function Hash_df. |
| entropy_input: | An input of a random value (i.e. entropy) from an entropy source. |
| Find_State: | A conventional routine for storing state(state_pointer) in a storage location and returning state_pointer pointing to that location. |
| Get_Entropy(x) | A conventional routine for accessing an entropy source and returning x bits of entropy. |
| Hash: | As used herein in refers to the primitive mixing function used in embodiments of the subject invention. Hash can be a known hash function (e.g. SHA1), a known keyed hash function (e.g. HMAC), a block cipher or any convenient mixing function. |
| max_no._of_bits: | Maximum number of bits for each call of Hash_df. In a preferred embodiment it is set equal to $2^{32}$. |
| no._of_bits: | Number of pseudorandom bits to be output by DRBG 16. |
| NULL: | No meaning or value is assigned to the identified item. |
| outlen: | Length of the out put of the primitive mixing function. Hash. Preferably outlen is chosen = seedlen. |
| prediction resistance: | Is the capability of an algorithm to resist prediction of future states by an attacker who has obtained current state information. It depends on the inherent strength of the algorithm and the frequency with which the states are reseeded with new entropy. As used more particularly herein it sometimes refers to the capability to call a reseed function. |
| prediction_resistance_request: | User input to Hash_DRBG requesting immediate new entropy_input. |
| pseudorandom bits: | Output of DRBG 16. Typically used as cryptographic key. |
| reseed_counter: | The number of calls to Hash_DRBG since the last entropy_input was received. |
| reseed_interval: | The maximum number of calls to Hash_DRBG before reseeding with a new entropy_input is required. In a preferred embodiment it is set equal to $2^{32}$. |
| requested_bits: | Output of Hash_df. |

TABLE 1-continued

| Term | Definition |
| --- | --- |
| requested_strength: | A user input to Instantate_DRBG and Hash_DRBG. In Instantate_Hash it determines strength for a particular nstantation. In Hash_DRBG it is tested to assure that the particular instantation selected has at least the strength requested by the user. |
| seedlen: | Length of seed V. |
| state_pointer: | A pointer to a set of initial values (i.e. a state) used to generate a cryptographic key. |
| state(state_pointer): | A state identified by a particular value of state_pointer. |
| state(state_pointer). "X" | An element of state(state_pointer) defining an initial value for a variable "X" used to generate a cryptographic key. |
| state_values | Values used in a particular instantiation of DRBG 16 to generate a cryptographic key. |
| strength: | A state_value used as an argument for Get_entropy call to Entropy Source 28 and which = the number of bits of entropy returned. (Note the number of binary bits may be > strength if the output of source 28 is not "flat".) |
| transformed_entropy_input: | Hash(entropy_input) It is stored as an element of a state(state_pointer) and used to validate the output of an entropy source. Hashing before storing increases the security of the source since actual outputs are not available to an attacker with access to the states. |
| V: | A state_value used as a seed in DRBG 16. |

In FIG. 1 system 10 is a generalized encryption system. Encryption engines 12 receive clear text messages CT and combine them with a secret input (hereinafter sometimes a "key" or "cryptographic key" or "encryption key") in accordance with an encryption standard such as the symmetric key standard, (DES); or the public key standard, (RSA) to generate encrypted messages E. The encrypted messages are the then sent to decryption engine 14 in any convenient manner where they are decrypted using the appropriate decryption key (which can be the same as the encryption key or may be part of an encryption/decryption key pair) to recover clear text messages CT for further distribution. (Only one decryption engine 14 is shown for simplicity of illustration.) Without knowledge of the keys used it is hard to recover clear text messages CT (or at least more costly than the value of the information obtained would justify). System 10 can also carry out other cryptographic operations such as digital signing of messages in a substantially similar manner. In a preferred embodiment of the subject invention encryption engines 12 are digital postage meters which use cryptographic techniques to authenticate digitally printed postal indicia and decryption engine 14 is incorporated in postal service mail handling systems to validate the indicia on mail pieces printed by the meters. (As used herein the term "cryptographic engine" refers to any apparatus which carries out encryption or decryption functions, or similar functions such as digital signing of messages.)

History shows, however, that in time any secret can be learned. System 10 therefore includes key generation system 15 for generating new keys from time to time as necessary. (The new keys must of course be distributed to engines 12 and 14 in a secure manner through secure communications link 17. This can be done in any convenient manner, details of which form no part of the subject invention.) System 15 includes a deterministic random bit generator, DRBG 16 (which is typically implemented as an application run on a programmed data processing system), data store 20 for storing algorithms and constants used to generate keys, as well as initial states defining various particular instantations of the algorithms, input 24 for input of various parameters or values used to specify the keys to be generated, and entropy source 28 for generating seed values used to initialize or reseed DRBG 16; as will be described further below. (Input 24 can be either a user input or a call from a higher level program.)

Entropy source 28 is a conventional apparatus which generates random output values based on measurement of physical phenomena. Typically, entropy sources are based on apparatus such as, for example, ring oscillators, high speed clocks and the drift among them, radioactive decay, and keystroke timing. While such entropy generators do produce numbers which are random in the sense that they are practically unpredictable, or in the case of radioactive decay truly unpredictable, they have proven to be unsatisfactory for directly generating keys for two reasons: (i) the output is not flat, i.e. all output values are not equally likely; and (ii) known entropy sources are too slow to generate the large number of keys needed for large cryptographic systems.

Figure 2:
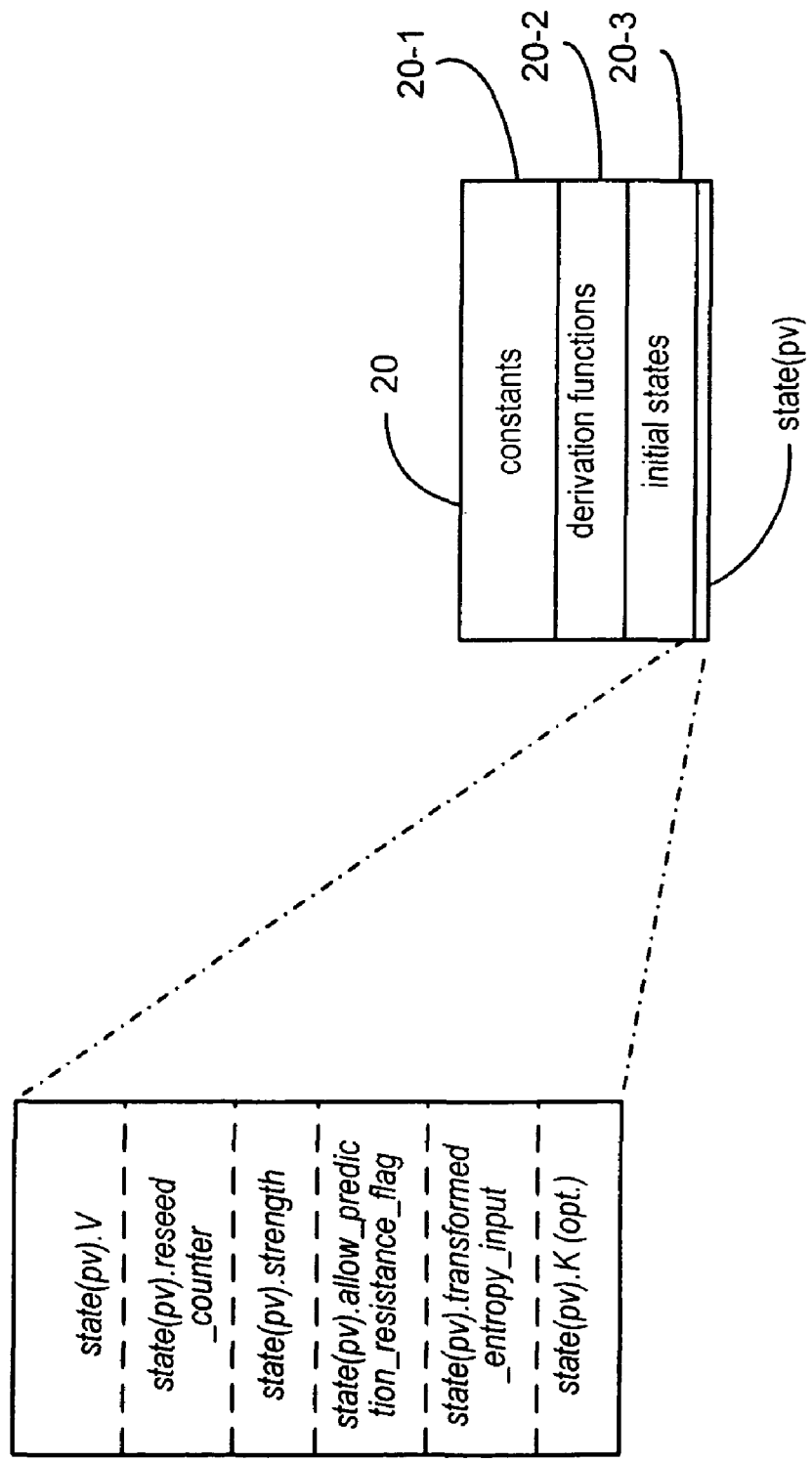
FIG. 2 shows a schematic representation of data stored in data store 20.

FIG. 2 shows contents stored in data store 20. Area 20-1 stores various constant parameters. In a preferred embodiment of the subject invention these include: seedlen, the length of seed V; outlen, the output length of a hash function; max_no._of_bits, the maximum number of bits for each call of a derivation function, and reseed_interval, the number of calls allowed before reseeding an algorithm. Area 20-2 stores derivation functions used to generate pseudorandom bits for use as cryptographic keys. Area 20-3 stores initial states for various instantations of the algorithms.

Elements of initial state state (pv) (i.e. the initial state identified by the state_pointer value pv) is shown in detail in FIG. 2. In a preferred embodiment of the subject invention these include: state(pv). V, state(pv).reseed_counter, state (pv).strength, state(pv).allow_prediction_resistance_flag, and state(pv).transformed_entropy_input. In other embodiments of the subject invention where, as will be described further below, a keyed hash function such as the known HMAC function, is used; key K is stored in state (pv).K It will be understood that, in general, multiple algorithms and corresponding states can be stored and selected in accordance with appropriate inputs.

Figure 3:
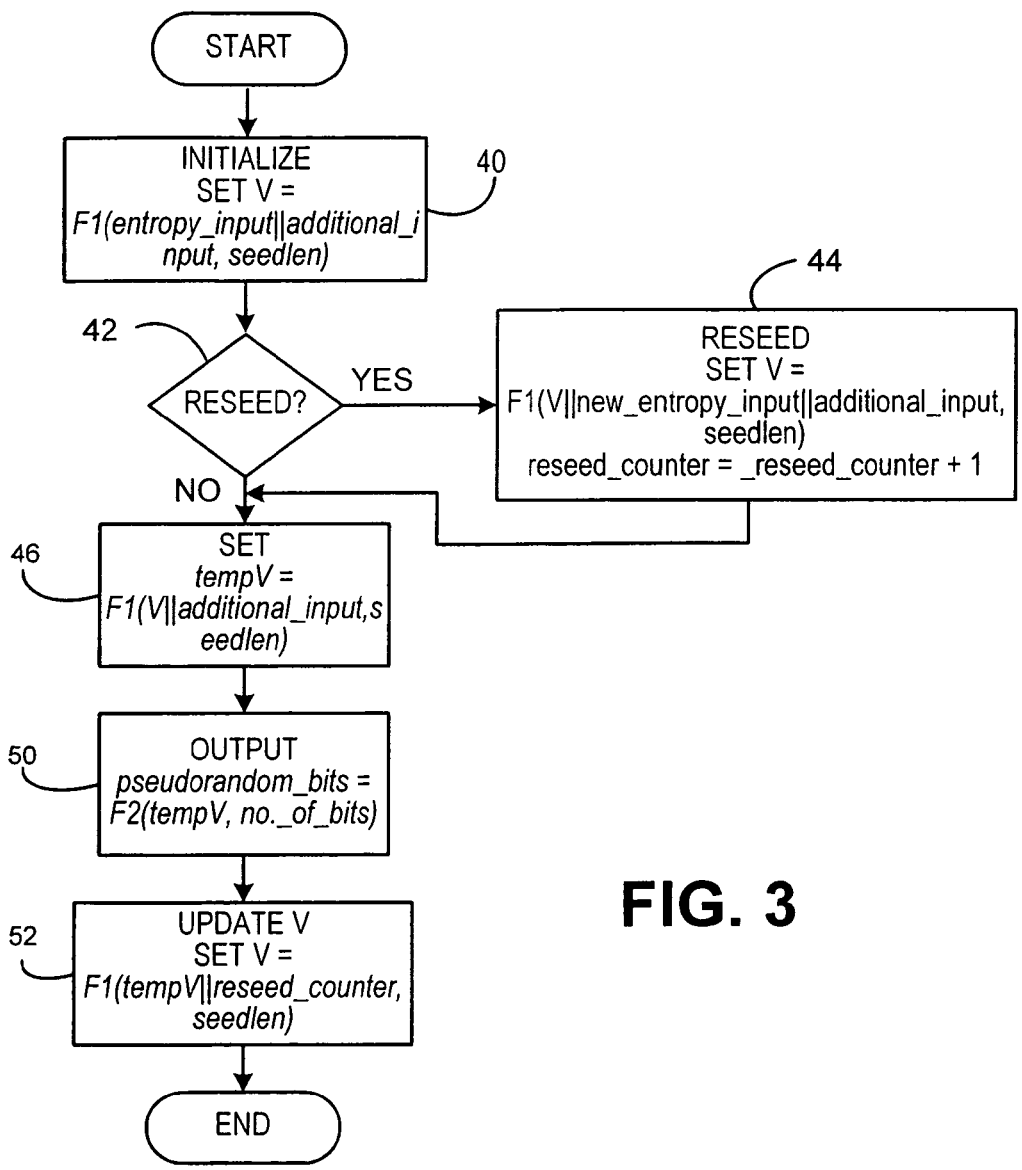
FIG. 3 shows a generalized flow diagram of a method for generating a cryptographic key.

FIG. 3 shows a flow diagram of the general operation of DRBG 16 in accordance with the subject invention. At step 40 DRBG 16 is initialized by setting seed V=F1

(entropy_input||additional_input, seedlen) where entropy_input is provided in response to a call to entropy source 28, and additional_input is provided from input 24. F1 takes a variable length input and provides an output of length=seedlen. F1 has the properties that it maintains the entropy of the input and is a one-way function.

At step 42, in response to a request through input 24 for pseudorandom bits (i.e. a cryptographic key) DRBG 16 determines if a reseed is necessary based on the state of reseed_counter. If so, at step 44 DRBG 16 calls a new entropy_input from entropy source 28, sets V=F1 (V||new_entropy_input||additional_input, seedlen) and sets reseed_counter=reseed_counter+1. Then, in either case, at step 46 DRBG 16 sets tempV=F1(V||additional_input, seedlen), and at step 50 DRBG 16 outputs a requested number of pseudorandom bits=F2(tempV, no._of_bits) where no._of_bits is input through input 24 and defines the requested number of pseudorandom bits for the requested cryptographic key. Preferably F2 is a variable output length pseudorandom function (hereinafter sometimes: "VO-PRF") which takes an input of length=seedlen. Then at step 52 DRBG 16 sets V=F1 (tempV||reseed_counter, seedlen) and exits.

In a preferred embodiment of the subject invention, step 40 is carried out by Instantate_DRBG, described below with respect to FIGS. 7A and 7B, step 44 is carried out by Reseed_DRBG, described below with respect to FIGS. 6A and 6B, and steps 46-52 are carried out by Hash_DRBG, described below with respect to FIGS. 5A and 5B. Preferably F1=F2 and is a hash based VO-PRF incorporating a known hash function, such as SHA1, having an output length=outlen=seedlen. A flow diagram for a suitable function (hereinafter: "Hash_df") is shown in FIG. 4.

Figure 4:
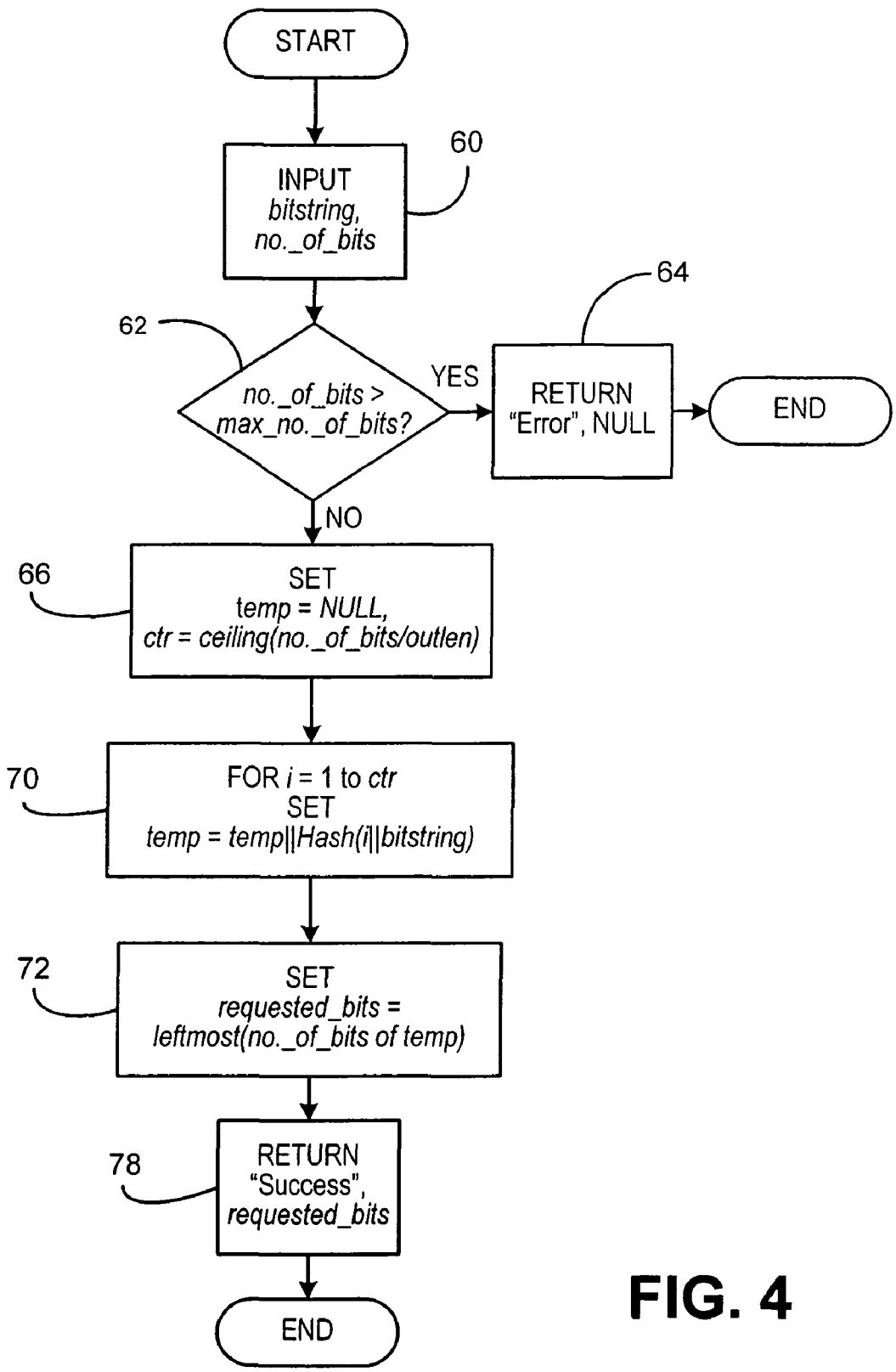
FIG. 4 shows a flow diagram of a variable output pseudorandom function.

At step 60 in FIG. 4 bitstring and no._of_bits are input. At step 62 DRBG 16 determines if no._of_bits>max_no._of_bits and, if so, at step 64 returns: "Error", NULL, and exits. Otherwise, at step 66 DRBG 16 sets: temp=NULL and ctr=ceiling(no_of_bits/outlen); where ceiling(x)=least integer>x. Then at step 70 DRBG 16 iterates temp=temp||Hash(i||bitstring) for i=1 to ctr; where Hash is any convenient hash function having an output length=outlen=seedlen, such as SHA1. Then at step 72 DRBG 16 sets: requested_bits=leftmost(no._of_bits of temp), at step 74 returns: Hash_status="Success", requested_bits; and exits.

In another embodiment of the subject invention Hash_df is implemented using a keyed hash function such as the known HMAC function. This embodiment of Hash_df is substantially as shown in FIG. 4 except that inputs at step 60 include optional key K as a key for the keyed hash function.

Figure 5A:
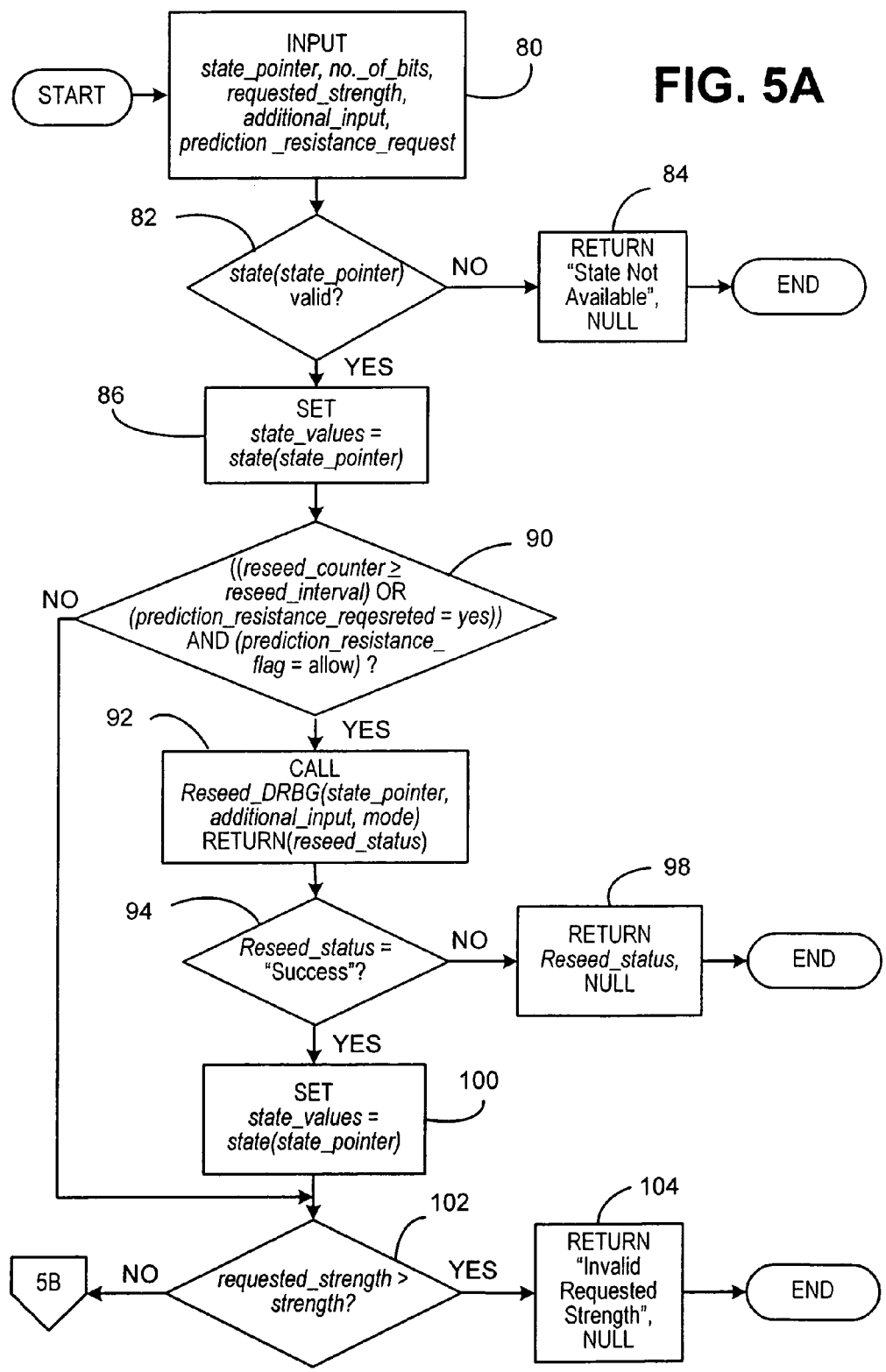
FIGS. 5A and 5B show a flow diagram of a method for generating a cryptographic key.
Figure 5B:
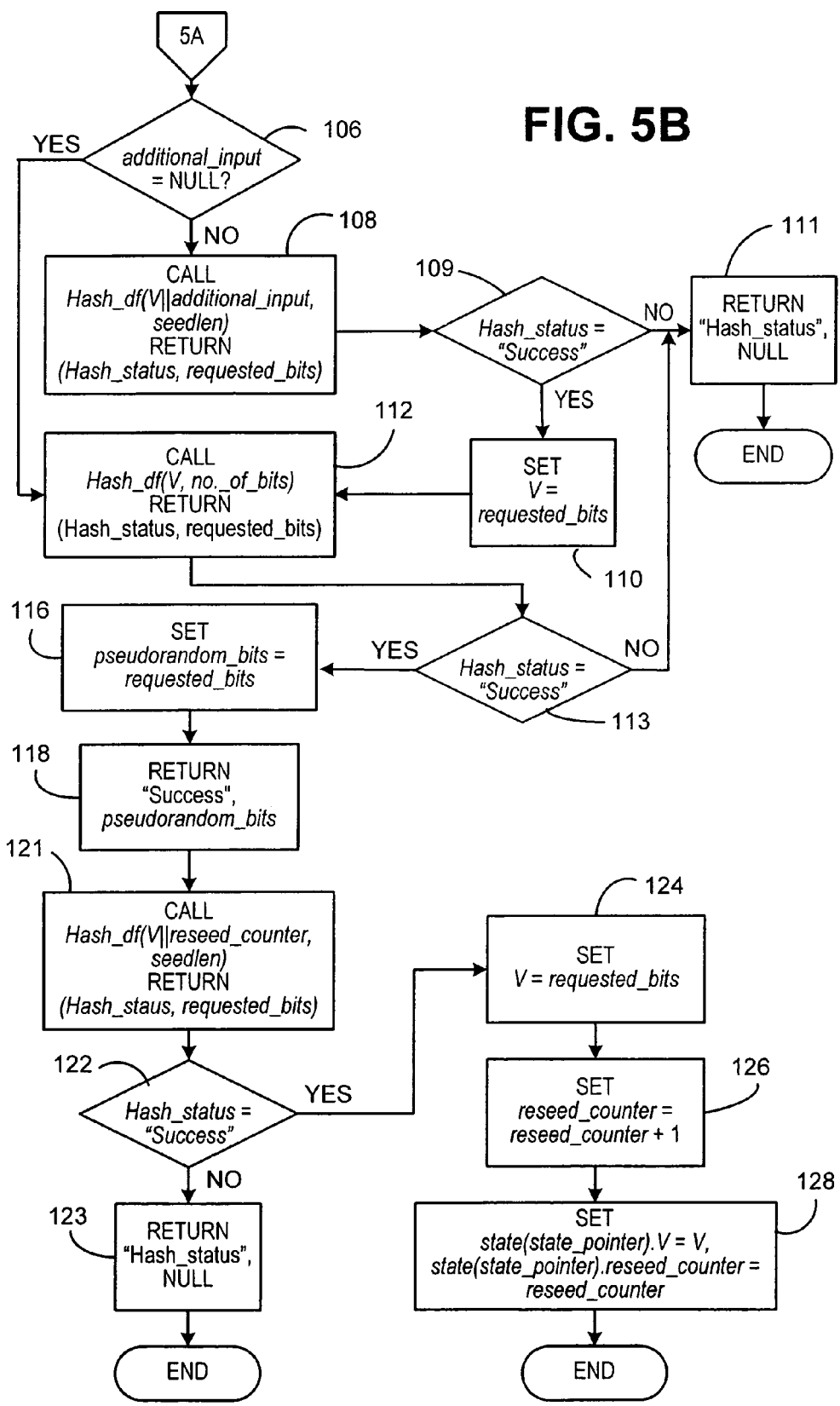

Turning to FIGS. 5A and 5B, a flow diagram of a program for generating pseudorandom bits for use as cryptographic keys (hereinafter Hash_DRBG) in accordance with the method of the subject invention is shown. At step 80 inputs state_pointer, no._of_bits, requested_strength, additional_input, and prediction_resistance_request, are received through input 24. In other embodiments the inputs can be received as the arguments of a call from a higher level program. Then at step 82 DRBG 16 determines if state(state_pointer) has a valid value (i.e. if state_pointer is within range and state(state_pointer) is defined). If not, at step 84 DRBG 16 returns: "State Not Available For State_Pointer", NULL, and exits.

Otherwise, at step 86 DRBG 16 sets state_values=corresponding state(state_pointer) elements (e.g. sets V=state(state_pointer). V), and at step 90 determines if (reseed_counter≧reseed_interval OR prediction_resistance_request=yes) AND (prediction_resistance_flag=allow). If not, DRBG goes to step 102.

Otherwise, at step 92 DRBG 16 calls: Reseed_DRBG (state_pointer, additional_input,), which updates state(state_pointer) with new entropy and returns reseed_status, and at step 94 determines if reseed_status="Success". If not, at step 98 DRBG 16 returns "Reseed_status", NULL, and exits.

Otherwise, at step 100 DRBG again sets state_values=corresponding state(state_pointer) elements and goes to step 102. (Note that state(state_pointer) has been updated by reseed_DRBG, and particularly that state(state_pointer).V has been reseeded with new entropy.)

At step 102 DRBG 16 determines if requested_strength>strength and, if so, at step 104 returns: "Invalid Requested Strength", NULL, and exits. Otherwise DRBG 16 goes to step 106 in FIG. 5B.

At step 106 DRBG 16 determines if additional_input=NULL. If so, it goes to step 112. Otherwise at step 108 DRBG 16 calls Hash_df(V||additional_input, seedlen). At step 109 DRBG 16 determines if Hash_status="Success" and, if not, goes to step 111 and returns: "Hash_status, NULL, and exits. Otherwise, at step 110 it sets V=requested_bits and goes to step 112. These steps, and similar steps in Reseed_DRBG and Instantate_DRBG, allow a user who so wishes, perhaps because of doubts about the security of entropy source 28, to provide additional_input as an independent entropy input.

At step 112 DRBG 16 calls Hash_df(V, no._of_bits) and returns Hash_status and requested_bits, and at step 113 determines if Hash_status="Success" and, if not, goes to step 111 and exits. Otherwise, at step 116 it sets pseudorandom_bits=requested_bits, and at step 118 returns: "Success", pseudorandom_bits, where the pseudorandom bits constitute the requested cryptographic key of a length=no._of_bits. Then at step 121 DRBG 16 calls Hash_df (V||reseed_counter, seedlen) to update V and returns Hash_status and requested_bits. At step 122 DRBG 16 determines if Hash_status="Success" and, if not, goes to step 123 and returns: "Hash_status", NULL, and exits. Otherwise at step 124 it sets V=requested_bits. Then at step 126 DRBG 16 sets reseed_counter=reseed_counter+1, and at step 128 sets state (state_pointer). V=V, state(state_pointer). reseed_counter=reseed_counter, thus updating state(state_pointer) prior to the next call to Hash_DRBG, and exits. (Note that the requested_bits returned at step 112 are in effect a temporary value for V which is used one time to generate pseudorandom_bits then updated again at step 121 before state(state_pointer). V is updated.)

Figure 6A:
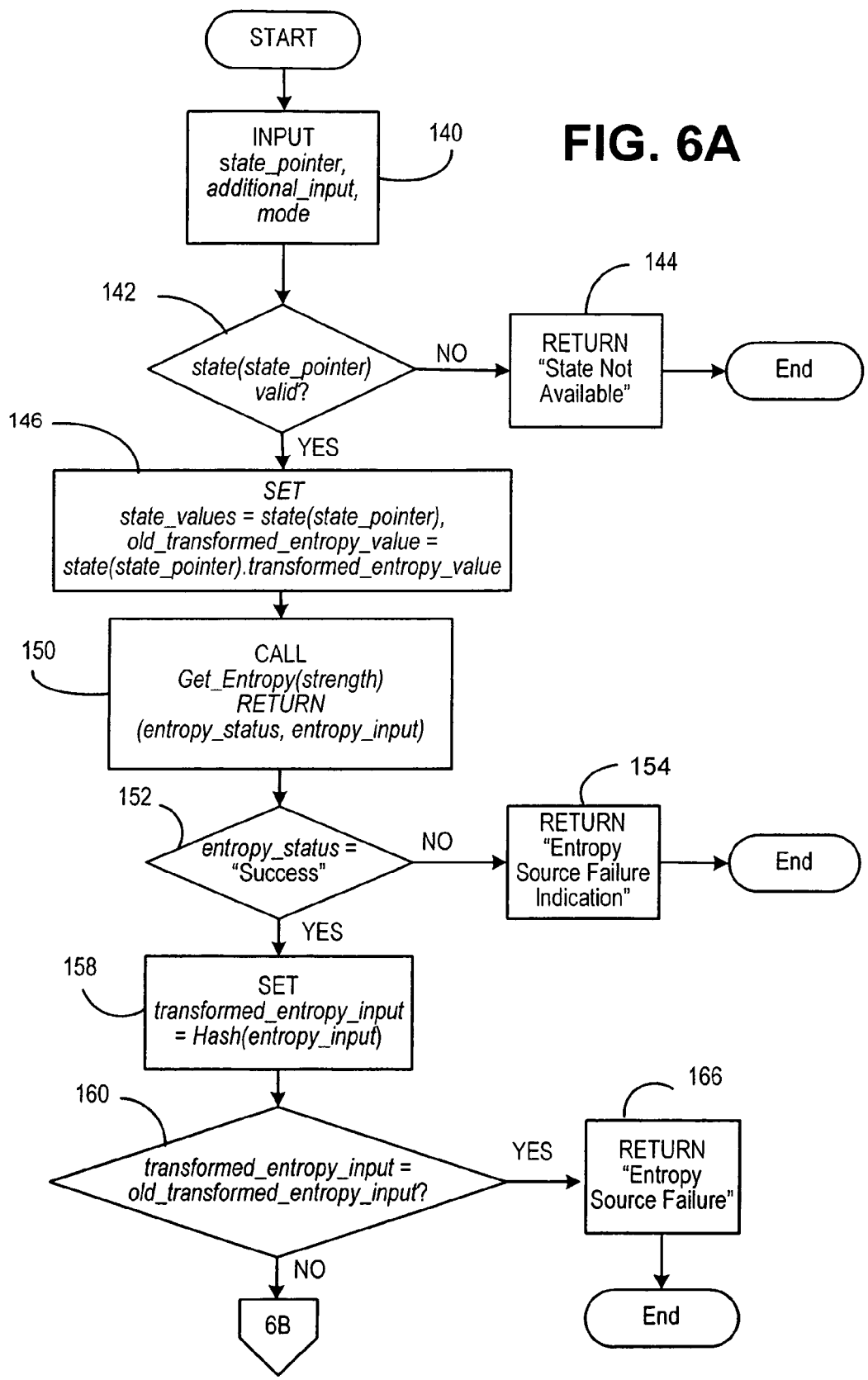
FIGS. 6A and 6B show a flow diagram of a method for reseeding the method of FIGS. 5A and 5B.
Figure 6B:
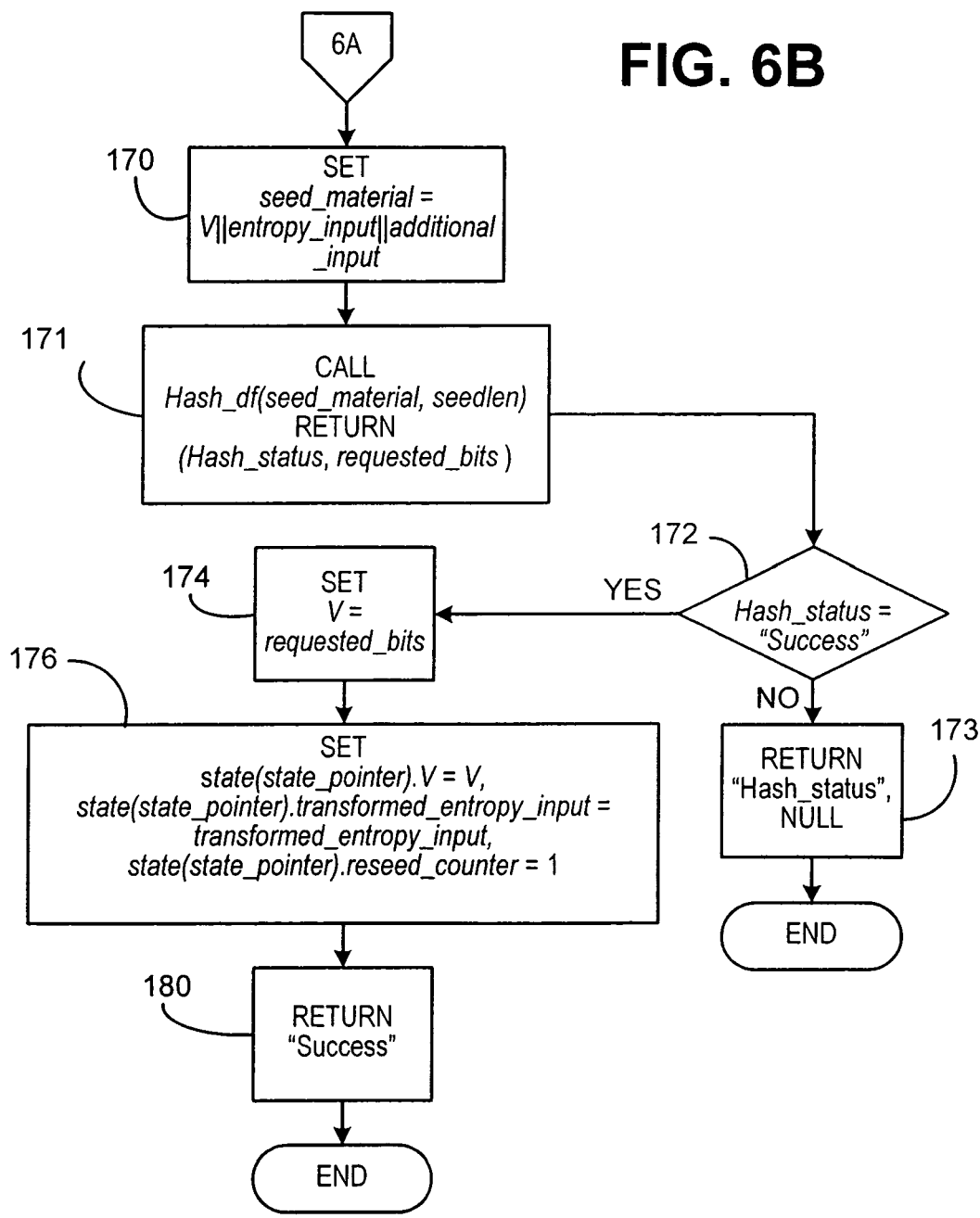

FIGS. 6A and 6B illustrate a method for reseeding. At step 140 Reseed_DRBG(state_pointer, additional_input,) is called by DRBG 16 from Hash_DRBG and inputs the call arguments. Then at step 142 DRBG 16 determines if state (state_pointer) has a valid value (i.e. if state_pointer is within range and state(state_pointer) is defined). If not, at step 144 DRBG 16 returns: "State Not Available For State_Pointer", and exits.

Otherwise, at step 146 DRBG 16 sets state_values=state (state_pointer), as described above, and also sets old_transformed_entropy_input=state(state_pointer).transformed_entropy_input.

Then at step 150, DRBG 16 sends Get_Entropy(strength) to entropy source 28 which returns entropy_status, entropy_input, in accordance with the argument value. At step 152 DRBG 16 determines if entropy_status="Success", and, if not at step 154 returns "Entropy Source Failure Indication" and exits.

Otherwise, at step 158 it sets transformed_entropy_input=Hash(entropy_input), and at step 160 determines if transformed_entropy_input=old_transformed_entropy_input. If so, at step 166 DRBG 16 returns: "Entropy Source Failure" and exits.

Otherwise, at step 160 DRBG 16 goes to step 170 (FIG. 6B) and sets seed_material=V∥entropy_input∥additional_material, (thereby reseeding the key generation process with additional entropy provided by a user) and goes to step 171 and calls Hash_df(seed_material, seedlen). At step 172 DRBG 16 determines if Hash_status="Success" and, if not, goes to step 173 and returns: "Hash_status", NULL, and exits. Otherwise, it goes to step 174 and sets V=requested_bits, goes to step 176 and sets: state(state_pointer). V=V, state(state_pointer). transformed_entropy_input=transformed_entropy_input, and state(state_pointer).reseed_counter=1, and at step 180 returns: "Success", and exits.

Figure 7A:
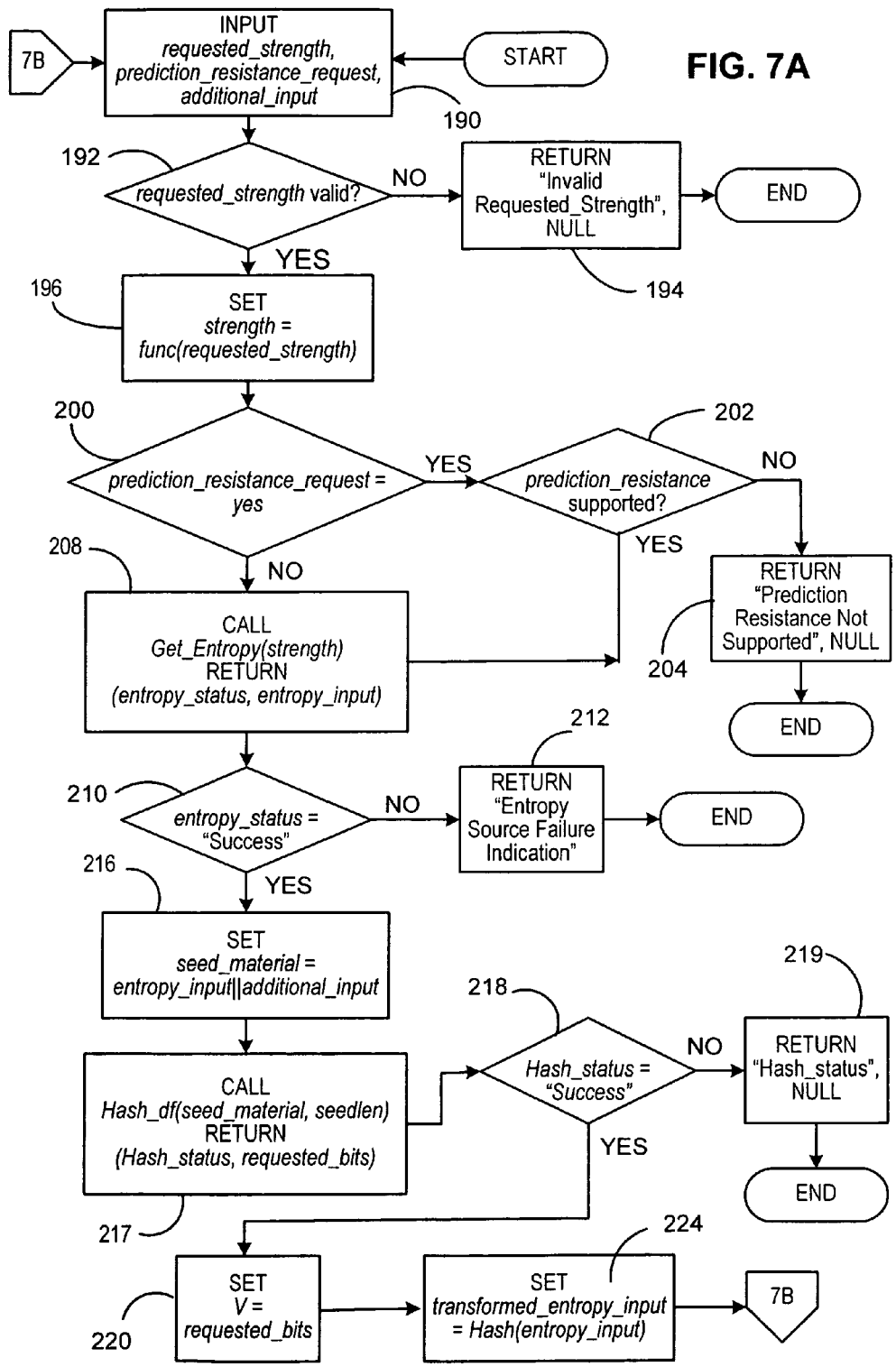
FIGS. 7A and 7B show a flow diagram of a method for generating instantations of the method of FIGS. 5A and 5B.
Figure 7B:
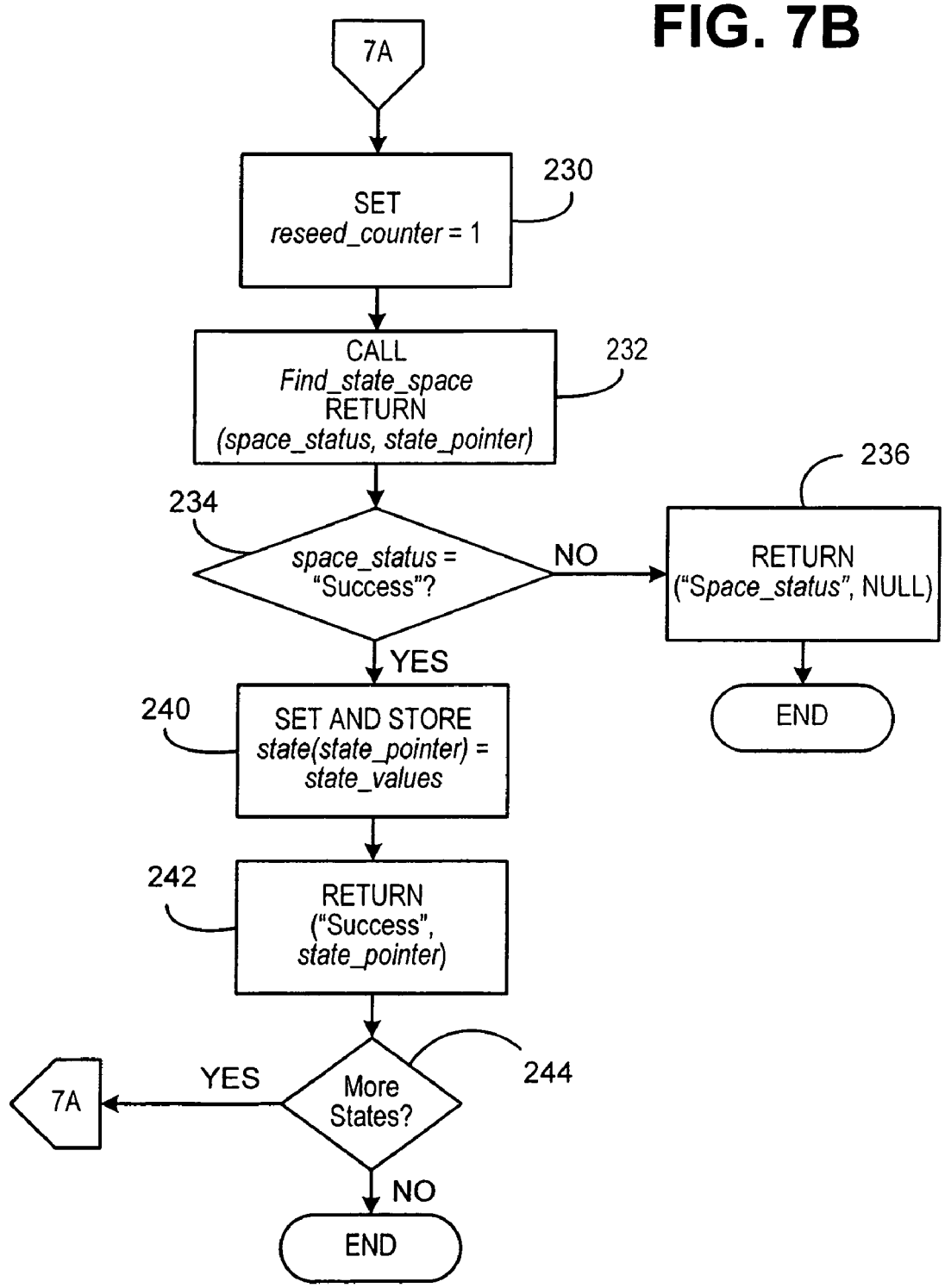

Turning to FIGS. 7A and 7B, a flow diagram of a program (hereinafter Instantate_DRBG) for generating various instantations of Hash_DRBG is shown. Instantate_DRBG returns: instantation_status, and state_pointer. At step 190 DRBG 16 inputs requested_strength, prediction_resistance_request, and additional_input. Then at step 192 it determines if requested_strength is valid (i.e. is within the appropriate predetermined range.) If not, at step 194 DRBG 16 returns "Invalid Requested Strength", NULL, and exits. Otherwise at step 196 DRBG 16 sets strength=to a predetermined function of requested_strength. In a preferred embodiment of the subject invention the range of requested_strength is from 0 to 256 and for:

$0 \leq$ requested_strength$\leq 80$; strength=80

$80 <$ requested_strength$\leq 112$; strength=112

$112 <$ requested_strength$\leq 128$; strength=128

$128 <$ requested_strength$\leq 192$; strength=192

$192 <$ requested_strength$\leq 256$; strength=256

Then at step 200 DRBG 16 determines if prediction_resistance_request indicates that prediction resistance has been requested in the current instantation. If so at step 202 it determines if prediction resistance is supported, and, if not, at step 204 returns "Prediction Resistance Not Supported", NULL, and exits.

Otherwise, at step 208 DRBG 16 calls Get_Entropy (strength) and returns entropy_status and entropy_input and at step 210 determines if entropy_status="Success." If not, at step 212 returns "Entropy Source Failure Indicated", NULL, and exits.

Otherwise, at step 216 DRBG 16 sets seed_material=entropy_input∥additional_input, (again providing user entropy input), and at step 217 calls Hash_df (seed_material, seedlen). At step 218 DRBG 16 determines if Hash_status="Success" and, if not, goes to step 219 and returns "Hash_status", NULL, and exits. Otherwise, at step 220 it sets V=requested_bits, and, at step 224 sets transformed_entropy_input=Hash(entropy_input).

Then at step 230 (shown in FIG. 7B) DRBG 16 sets reseed_counter=1, and at step 232 calls Find_state_space, which returns: space_status, state_pointer. Find_state_space is any convenient subroutine which determines an appropriate memory space for storing a state and a pointer, state_pointer, to that memory space. Such subroutines are well known to those skilled in the art and further details are not believed necessary to an understanding of the subject invention.

Then at step 234 DRBG 16 determines if space_status="Success", and if not, at step 236 returns space_status, NULL, and exits. Otherwise at step 240 DRBG 16 sets elements of state(state_pointer), stored in the memory space determined, equal to corresponding state_values (e.g. state(state_pointer). V=V), and at step 242 returns: "Success", state_pointer. At step 244 DRBG 16 determines if there are more instantations to be generated and, if so, returns to step 190, and otherwise exits.

In embodiments of the subject invention where Hash is a keyed hash function Instantate_DRBG will generate and incorporate into state(state_pointer) key K in any convenient manner.

Since DRBG's are deterministic, an attacker with full knowledge of the internal states (and possibly any additional_inputs) will be able to determine any keys generated until the system is reseeded with new entropy. Prediction resistance is a design choice based on a balancing of the desired degree of security if the system is compromised; i.e. if an attacker obtains knowledge of the system's internal states, against costs of obtaining new entropy. Prediction resistance can be considered in terms of the number of pseudorandom bits produced before reseeding; i.e. max_no._of_bits*reseed_interval.

Security of a DRBG against an exhaustive search attack is determined by the length of the "secret"; in the subject invention the length of V, seedlen. In a preferred embodiment of the subject invention, for simplicity of design of derivation functions, seedlen is chosen=outlen and the primitive Hash function is chosen so that outlen=strength (or outlen>strength to the extent that the entropy source is not "flat"). If "collision resistance" is required then Hash is chosen so that seedlen=outlen$\geq 2$*strength. ("Collision resistance" is a concept well understood by those skilled in the art and need not be discussed further here for an understanding of the subject invention.)

It can be shown that if Hash is a pseudorandom function (PRF) with a fixed output length, then Hash_df is a PRF with a variable output length and V as an index key.

It can be shown the subject invention provides "backtracking resistance" so that if the current value of V is compromised the attacker cannot derive any previous states or temporary values since Hash is a one way function.

It can be proven for the subject invention that, after Reseed_DRBG is called prediction resistance is restored to its pre-compromise level.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for generating a key for a cryptographic engine, said method comprising:
   initializing in a deterministic random bit generator a seed value, V, as a first function of an entropy_input;
   generating by said deterministic random bit generator a temporary seed value, tempV, by applying said first function to said seed value, V;
   generating by said deterministic random bit generator a requested number of pseudorandom bits as a second function of said temporary value, tempV;
   setting by said deterministic random bit generator said value, V, equal to a third function of said temporary value, tempV;
   outputting by said deterministic random bit generator to said cryptographic engine said requested number of pseudorandom bits; and
   using, at said cryptographic engine, said requested number of pseudorandom bits as said key in a cryptographic operation,
   wherein said first and third functions are one-way functions which take a variable length input and generate an output of a predetermined length, and which maintain said variable length input's entropy; and said second function is a pseudorandom function which takes in input equal in length to said output of said first and third functions and generates said requested number of pseudorandom bits.

2. A method as described in claim 1, wherein before a temporary seed value, tempV, is generated, said method further comprises:
   determining by said deterministic random bit generator if a reseed operation is necessary; and
   if so, setting by said deterministic random bit generator said value, V, equal to a new value by applying said first function to said value, V, concatenated with a new entropy_input.

3. A method as described in claim 2 where said first and third functions comprise applying an operator, F1, to first and third inputs and said second function comprises applying an operator, F2, to second inputs.

4. A method as described in claim 3 where said first function equals applying said operator, F1, to arguments (X∥additional_input, seedlen) and said third function equals applying said operator, F1, to arguments (tempV∥reseed_counter, seedlen) and said second function equals applying said operator F2 to arguments (tempV, requested_numbe_of_bits): where X is said first input, taking on values: entropy_input, V∥entropy input or V as required, V is said third input, tempV is said second input, additional_input is a user supplied entropy input, (which can be a NULL input so that X∥NULL=X), seedlen is a predetermined constant which determines an output length for said first and third functions, reseed_counter is a value representing the number of requests for key generation since a last reseed operation, and said requested_number_of_bits determines an output length for said second function.

5. A method as described in claim 3 where said operator F1 equals said operator F2.

6. A method as described in claim 5 where said functions comprise:
   receiving a binary input of arbitrary length, bitstring, and an integer defining a number of bits to be returned, where: bitstring takes on values: X∥additional_input, tempV∥reseed_counter, or tempV, and said integer takes on values: seedlen or requested_number_of_bits, as required;
   setting a value, temp, equal to NULL;
   setting a value, ctr, equal to ceil (said integer divided by an output length, outlen, of a preselected hash function, Hash,), where cell is a function such that ceil(x) equals the least integer greater than or equal to then
   for an index i taking on values from 1 to ctr iteratively setting said value, temp, equal to temp∥Hash (i∥bitstring);
   selecting a number of bits equal to said integer from said value, temp, in a predetermined manner and setting a value, requested_bits, equal to said selected bits; and
   returning said value, requested_bits.

7. A method as described in claim 6 where said preselected hash function, Hash, is chosen so that said length, outlen, is equal, to or greater than said value, strength, or, if collision resistance is required, is equal to or greater than 2 times strength, and said constant, seedlen, is set equal to said length, outlen.

8. A system for generating a cryptographic key comprising:
   an input for input of parameters or values used to specify a cryptographic key to be generated;
   a data store for storing constants used to specify said key;
   an entropy source;
   a deterministic random bit generator communicating with said input, said data store, and said entropy generator for generating said cryptographic keys, said deterministic random bit generator comprising:
      means for initializing a seed value, V, as a first function of an entropy_input received from said entropy source;
      means for generating a temporary seed value, tempV, by applying said first function to said value, V;
      means for generating a requested number of pseudorandom bits as a second function of said temporary value, tempV,
      means for setting said value, V, equal to a third function of said temporary value, tempV; and
      means for outputting said requested number of pseudorandom bits for use as said cryptographic key,
   wherein said first and third functions are one-way functions which take a variable length input and generate an output of a predetermined length, and which maintain said variable length input's entropy; and said second function is a pseudorandom function which takes in input equal in length to said output of said first and third functions and generates said requested number of pseudorandom bits.

9. A system as described in claim 8 where said deterministic random bit generator further comprises:
   means for determining if a reseed operation is necessary; and
   means for setting said value, V, equal to a new value by applying said first function to said value, V, concatenated with a new entropy_input if a reseed operation is necessary.

10. A system as described in claim 9 where said first and third functions comprise applying an operator, F1, to first and third inputs and said second function comprises applying an operator, F2, to second inputs.

11. A system as described in claim 10 where said first function equals applying said operator, F1, to arguments (X∥additional_input, seedlen) and said third function equals applying said operator, F1, to arguments (tempV∥reseed_counter, seedlen) and said second function equals applying said operator F2 to arguments (tempV, requested_number_of_bits): where X is said first input, taking on values: entropy_input, V∥entropy_input or V as required, V is said third input, tempV is said second input, additional_input is a user supplied entropy input, (which can be a NULL input so that X||NULL=X), seedlen is a predetermined constant which determines an output length for said first and third functions, reseed_counter is a value representing the number of requests for key generation since a last reseed operation, and requested_number_of_bits determines an output length for said second function.

12. A system as described in claim 10 where said operator F1 equals said operator F2.

13. A system as described in claim 10 further comprising:
a cryptographic engine; and
a secure communications link for communicating said requested number of pseudorandom bits from said deterministic random bit generator to said cryptographic engine.

14. A system as described in claim 13 where said cryptographic engine is part of a postage meter.

* * * * *